Nov. 18, 1958 P. J. WEAVER ET AL 2,860,848
CONTAINER FILLING APPARATUS
Filed Sept. 23, 1955 3 Sheets-Sheet 1

INVENTORS.
PAUL J. WEAVER
OLIVER R. TITCHENAL
BY
ATTORNEYS.

Nov. 18, 1958 P. J. WEAVER ET AL 2,860,848
CONTAINER FILLING APPARATUS
Filed Sept. 23, 1955 3 Sheets-Sheet 2
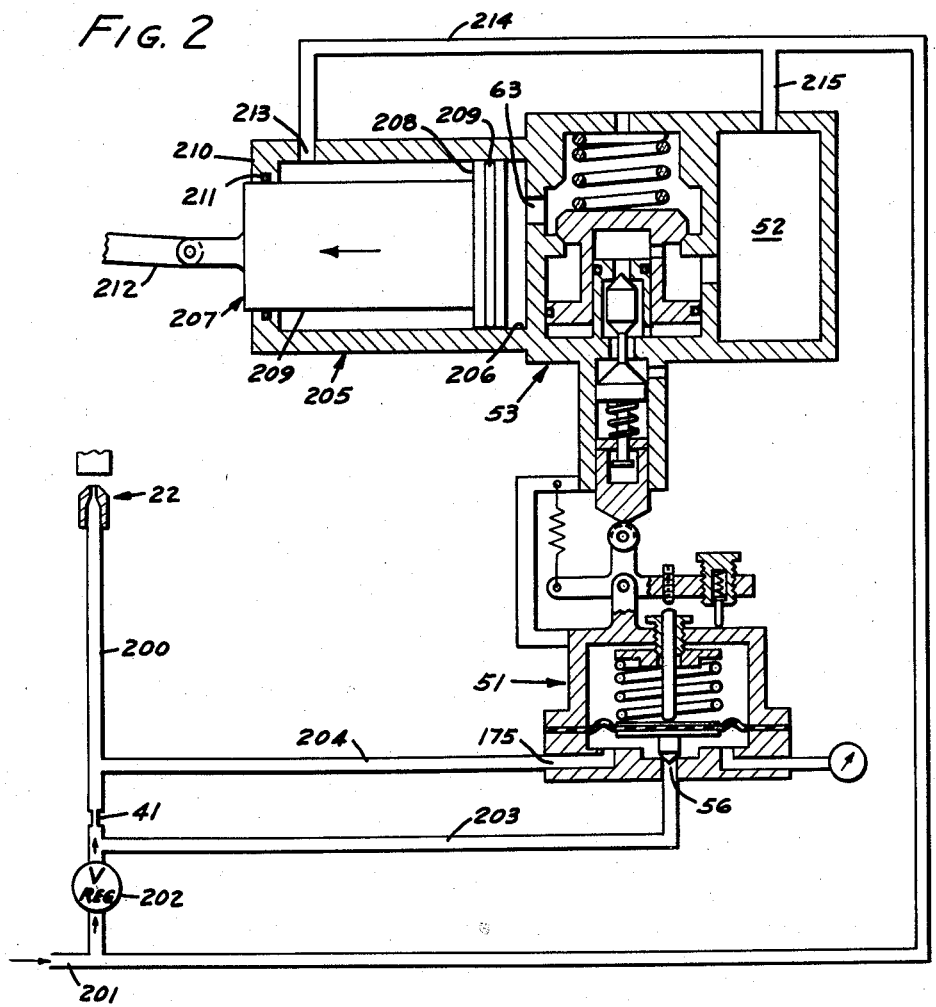
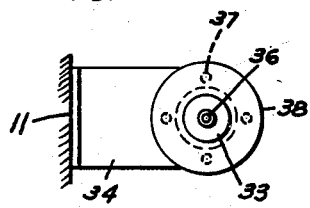
INVENTORS.
PAUL J. WEAVER
OLIVER R. TITCHENAL
BY
Ward, Neal, Haselton, Orme & McElhannon
ATTORNEYS.

Nov. 18, 1958

P. J. WEAVER ET AL 2,860,848

CONTAINER FILLING APPARATUS

Filed Sept. 23, 1955

INVENTORS.
PAUL J. WEAVER
OLIVER R. TITCHENAL
BY
Ward, Neal, Haselton, Orne & McElhannon
ATTORNEYS United States Patent Office 2,860,848
Patented Nov. 18, 1958

2,860,848
CONTAINER FILLING APPARATUS

Paul J. Weaver, Paramount, and Oliver R. Titchenal, Emeryville, Calif., assignors to St. Regis Paper Company, New York, N. Y., a corporation of New York Application September 23, 1955, Serial No. 536,076

9 Claims. (Cl. 249—63)

This invention relates to apparatus for filling containers to accurate weight.

In filling containers, such as 100 pound bags of sugar, an error of so small an amount as one-half ounce per bag builds up to a monetary loss of many thousands of dollars per year. In addition, because of standards of accuracy set by law, it is ordinarily necessary to employ a person to watch a weighing scale and make up or subtract enough of the product to meet the standards. When the product is contained in a closed sack which is filled through a nozzle, this adjustment of weight is such a problem that frequently the filling machinery is set to overfill the bag, and the resulting loss is simply absorbed as an expense.

It is an object of this invention to provide means for filling containers to an accurate weight with a speed commensurate with commercial requirements, and to an accuracy which will meet legal requirements without requiring adjustment after the bag is filled. In fact, it has been found that the means disclosed herein permit a 100 pound bag of sugar to be filled in approximately six seconds to a consistent accuracy of plus or minus one ounce.

This invention is carried out in connection with a load-deflected member which is deflected by the container as the container is filled. The deflection of the member is proportional to the weight of product in the container. A variable orifice member comprising a discharge orifice and a buffeting surface is provided whose separation is determined by the deflection of the beam. A stream of pressurized fluid such as air is discharged from the orifice upon the buffeting surface. The buffeting surface and the orifice are moved toward each other by the deflection. The more the deflection, the closer are the orifice and buffeting surface moved together. This causes a back pressure from the orifice which is proportional to the deflection, and which is also proportional to the weight of the product in the container. This back pressure is then used as a signal to control a system for closing a supply valve in the product supply line. When a back pressure is reached which corresponds to a fully loaded container, the supply valve is closed.

A further feature of the invention resides in apparatus for filling a container in which a major portion of the ultimate product weight is quickly supplied to the container at a relatively rapid rate. After the major portion of the product is dumped into the container, then the flow of product into the container is cut to a rate at which an error in the precise instant of product cut-off which might result from such causes as lag-time in the operation of machinery or in a small error in adjustment to result in only a relatively unimportant error in the total weight dumped into the container.

The above and other features of this invention will be fully understood from the following detailed description and the accompanying drawings of which:

Fig. 2 is a further schematic illustration, partly in section and with parts broken away, of another embodiment of the invention, certain of the sections being in a vertical plane;

Fig. 5 is a top plan view of a portion of the aforementioned secondary orifice and taken substantially along line 5—5 of Fig. 1.

Figure 1:
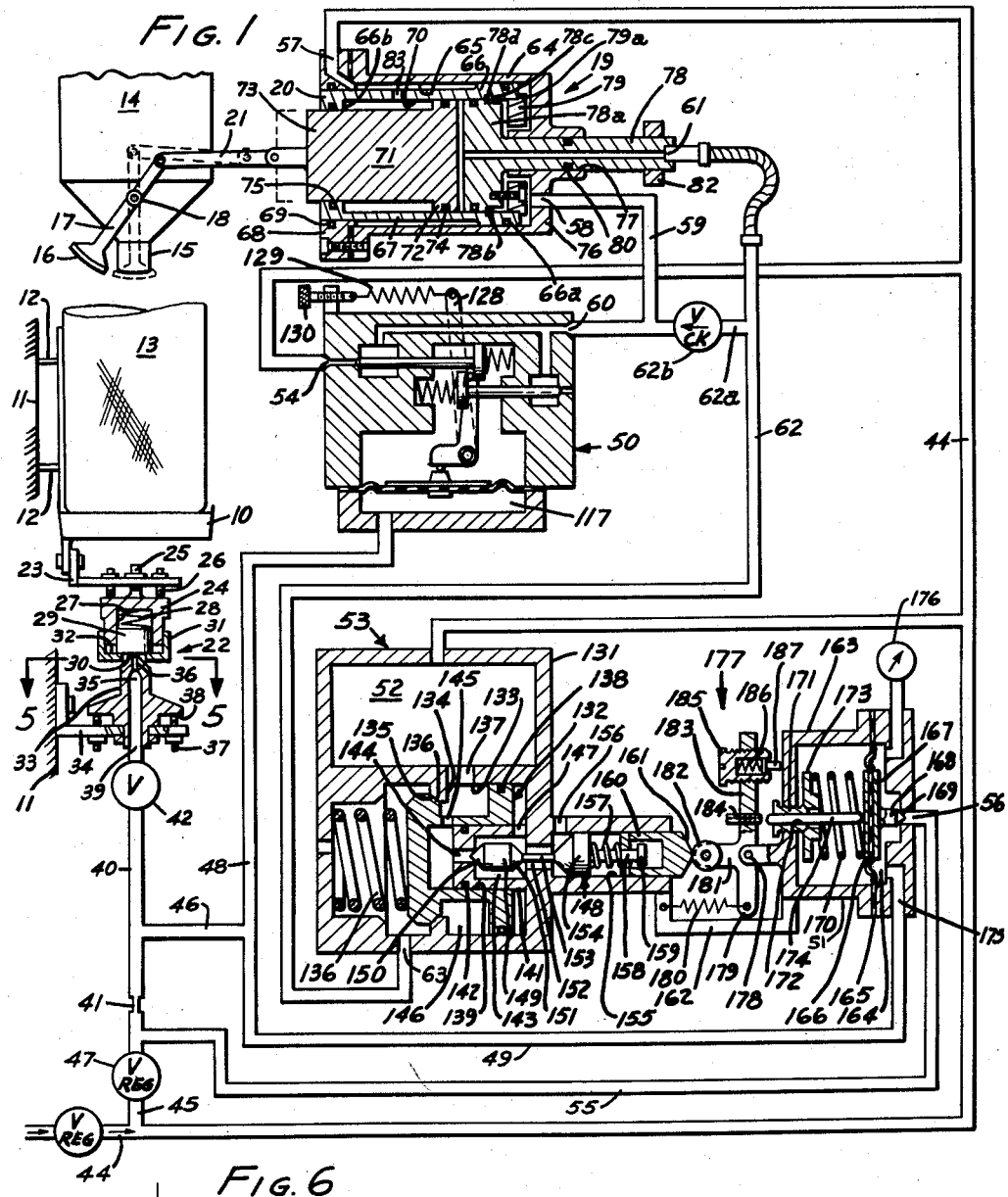
Fig. 1 is a schematic illustration, partly in section and with parts broken away, of one form of apparatus embodying the bag filling machine in accordance with the present invention, a bag holder and bag filling spout being viewed from the side.

Machines according to this invention are adaptable to fill many types of containers with substances which are fluid, or which are capable of being "fluidized" for granular flow, by use of an "air pad," for example. For convenience this machine will be described in connection with the filling of a bag of sugar, using air as the working fluid to actuate the machine. It will be recognized that the apparatus is also adaptable to filling other types of containers, such as cans, bottles and the like, with liquid or pulverulant solids, such as oils, flour, meal wheat and the like, for a few examples.

This invention utilizes the deflection of a member in response to an applied weight for providing a signal to a control system. The weight applied is the substance put into the container. For this purpose, a bag chair 10 is connected to a support 11, by flexures 12. These flexures may be any beam which can be deflected by a weight. Simple flat metal plates have been found to give excellent results. For filling 100 pound sacks, steel plates which flex approximately .080 inch for a load of 100 pounds of weight have given uniform and accurate weighing signals. A bag 13 or other container to be filled is rested upon the bag chair.

This invention is also adaptable to be used with other deflecting members, such as pivoted scale beams, and also even spring balances.

A hopper 14 having a discharge nozzle 15 is positioned so as to discharge the product thereinto.

A supply valve for this system may be as simple as the gate 16 shown mounted to the hopper by an arm 17 which arm is attached to a pivot 18 so that the gate can be swung across the nozzle to reduce the throat of the nozzle by an amount which is determined by the position of the arm 17.

A power cylinder 19 contains a compound piston assembly 20 which is connected by a link 21 to the arm 17 of the supply valve. Actuation of the power cylinder to extend the piston assembly will cause arm 17 of the shut off valve to pivot and thus close the nozzle of the hopper by an amount determined by the position of the piston assembly 20. The object of the control circuit of this invention is to position the piston in the power cylinder so as to slow the rate of flow to a dribble and then close the material supply valve at the instant when the bag is filled to the correct weight.

The control system comprises a pneumatic circuit which has a secondary, variable orifice assembly 22, which is responsive to the deflection of the flexures. A flange 23 holds a cage 24 by means of a bolt 25 and levelling screws 26. The cage has a bore 27 to receive an overtravel spring 28 and a buffeting member 29. This buffeting member fits snugly and slidably in the bore 27, and has a lower flat buffeting surface 30. A retainer 31 holds the buffeting member in the bore, and a lower inner shoulder 32 on the retainer establishes a reference level for the buffeting surface. It will be appreciated that the cage and the buffeting surface will move upward and downward with the bag chair.

An orifice member 33 is attached to a flange 34 on support 11. The orifice member does not move up and down with the bag chair as the bag is being filled, while the buffeting surface does so move. Deflection of the bag chair therefore varies the adjustment of the secondary orifice by changing the spacing between the orifice member and the buffeting surface.

The orifice member has a central air passage 35 leading to an accurately formed orifice 36. Levelling screws 37 in flange 34 are provided for levelling the orifice member. A shoulder 38 on the orifice provides bearing points for the levelling screws 37. The orifice member and the cage are levelled so that the orifice discharges air precisely perpendicularly upon the buffeting surface. A threaded air inlet 39 receives air from a control circuit, a part of which comprises the conduit 40 (hereafter referred to as the "control circuit"). This conduit 40 interconnects the secondary orifice with a primary orifice 41, which primary orifice comprises a restrictor in the air line. A shut-off valve 42 is provided in said conduit 40.

Air is supplied as shop pressure to conduit 44 and through conduit 45 to a regulator valve 47 which operates to establish a preselected air pressure at the primary orifice 41 independently of the rate of flow through said primary orifice and regulator. In practice it has been found advantageous to set this regulator to maintain a pressure of 30 pounds per square inch at the primary orifice.

A constant pressure is therefore provided at the primary orifice, and the pressure in control circuit 40 is a direct function of the variable spacing between the buffeting surface 30 and the orifice 36 and the secondary variable orifice member 22, since the closer the orifice 36 is to the buffeting surface 30, the greater is the back pressure in control circuit 40. The pressure in this control circuit 40 is thus proportional to the weight on the bag being filled and this pressure may be utilized as a signal to indicate when the bag is filled to the desired weight. Pressure in control circuit 40 will be referred to hereafter as the "control circuit pressure."

A conduit 46 from the control circuit 40 branches to form conduits 48 and 49 which respectively lead to a power valve 50 and to a trigger valve 51. Shop air pressure from conduit 44 is provided to the accumulator chamber 52 of a cut-off valve 53, and also to the power air inlet port 54 of the power valve 50 through branches of conduit 44. A conduit 55 branches from conduit 45 between regulator 47 and primary orifice 41 to connect with the regulated control pressure inlet port 56 of trigger valve 51.

Shop air pressure is also supplied from conduit 44 to retraction port 57 of the power cylinder. The primary power inlet 58 of the power cylinder is connected by means of a conduit 59 with the power air port 60 of power valve 50. The secondary power inlet 61 of the power cylinder is connected by conduit 62 to the outlet port 63 of cut-off valve 53. A conduit 62a with a check valve 62b therein interconnects conduits 59 and 62. The direction of flow permitted by the check valve is indicated by the arrow.

From the foregoing description it will be appreciated that pressure from the control circuit 40 is provided to the power valve 50 and to the trigger valve 51. The power valve 50 directly controls the supply of air pressure to the primary power air inlet of power cylinder 19, and trigger valve 51 controls the operation of a cut-off valve 53 which supplies additional air to a secondary power air inlet of said power cylinder.

The details of the various valves and their interconnection to actuate the power cylinder at the correct moments for supply valve control will now be described.

A power cylinder 19 comprises an outer shell 64 having a smooth walled primary cylinder 65 within. A telescopic piston assembly 20 fits within said cylinder which has a primary piston 66 at the right hand end as shown in Fig. 1. An O ring 66a makes a sliding seal between the primary piston and the cylinder. A primary piston rod 67 having a diameter less than that of the piston extends from said piston and makes a sliding fit in an end plate 68 which is bolted to the outer shell 64 to close cylinder 65. An O ring 69 seals between the piston rod 67 and the end plate.

The primary piston 66 has an inwardly extending annular shoulder 69 at the outermost end thereof, and a secondary cylinder 70 within. The secondary cylinder receives a secondary piston 71 which has an enlarged piston portion 72 at one end thereof and a narrow rod portion 73 which latter makes a sliding fit with the shoulder 61. O rings 74 and 75 respectively seal between the secondary piston and the secondary cylinder 70, and between the narrow rod portion of the secondary piston and the shoulder 69.

A cap 76 at the right hand end of cylinder 65 has a rod passage 77 for accommodating a rod 78 which has an enlarged end 78a. The enlarged end makes a sealing contact with the wall of secondary cylinder 70. A key 78b is seated in a key groove 78c in the wall of secondary cylinder 70, and bears against a shoulder 78d on the enlarged end of the rod. A retainer cap 79 is bolted to the enlarged end of the rod 78, and has a shoulder 79a which engages the end of primary piston 66. Thus rod 78 moves with the primary piston and is rigidly fixed thereto.

O ring 80 on the rod makes a seal between the rod 78 and the wall of shaft passage 77. The primary power inlet 58 for the primary cylinder 65 passes through the cap 76, and the secondary power inlet 61 for the secondary cylinder passes through the rod 78.

An adjustable stop nut 82 is threaded onto the rod 78 to limit travel of the primary piston.

It will be seen that the piston assembly 20 is telescopic, and axially shiftable. Air pressure admitted through the primary power inlet 58 will cause the entire piston assembly to be shifted in the cylinder 65 until stop 82 engages cap 76. Then there will be no further movement of the piston assembly until air is admitted to the secondary power inlet 61 to move the secondary piston. When pneumatic pressure is exerted through said secondary power inlet, the secondary piston will be extended from the primary piston. A port 83 through the wall of primary piston rod 67 admits return air from retraction port 57 to the left hand side of the enlarged piston portion 72 of the secondary piston.

Figure 3:
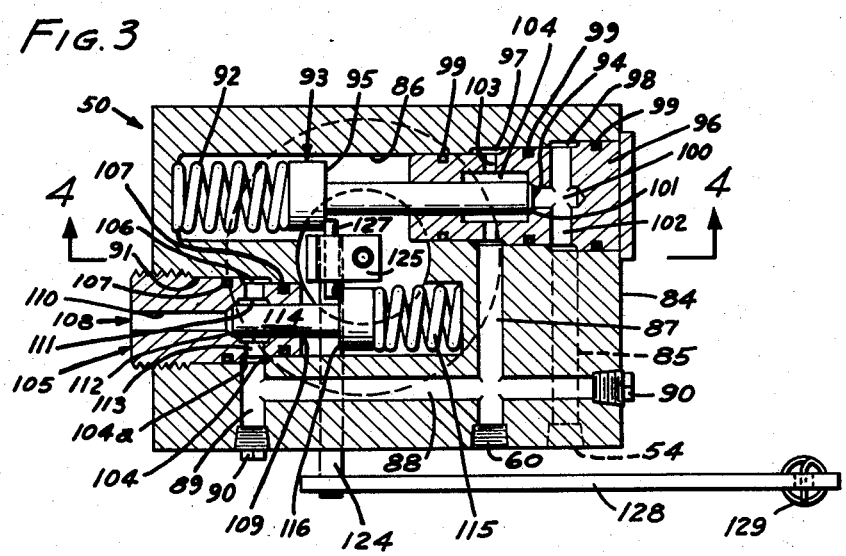
Fig. 3 is a sectional view in detail of a power valve employed in the apparatus of Fig. 1, the section being taken substantially along line 3—3 of Fig. 4.
Figure 4:
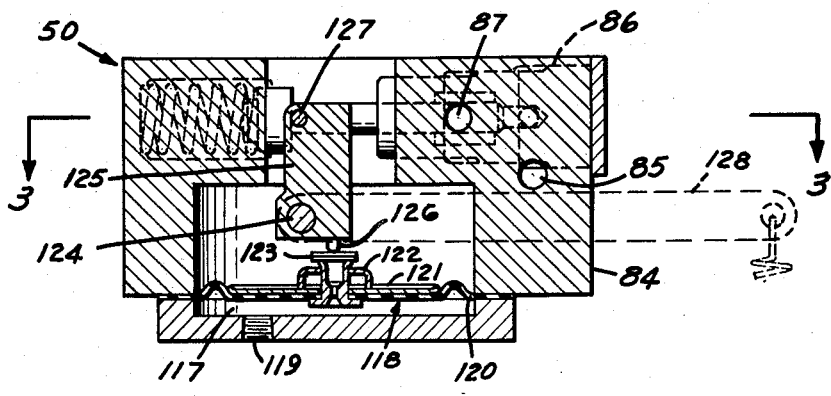
Fig. 4 is a sectional view, partly in section and with parts broken away, the section being taken substantially along line 4—4 of Fig. 3.

The power valve 50 is shown in detail in Figs. 3 and 4, and in somewhat schematic form in Fig. 1. This power valve has a body 84, with a power air inlet passage 85 tapped into a stepped power poppet bore 86. This power air inlet passage 85 is connected to the power air inlet port 54. A power air supply passage 87 is formed by drilling a bore to intersect power poppet bore 86, and this power air supply passage 87 connects with the primary power inlet 58 of the power cylinder by means of conduit 49.

A cross bore 88 is drilled so as to intersect power air supply passage 87 and an exhaust passage 89. The cross bore 88 and the exhaust passage 89 are closed by plugs 90 at the outside of body 84. The exhaust passage 89 intersects a stepped exhaust poppet bore 91.

In the power poppet bore 86 there is an inlet pressure balancing spring 92 which presses against a power poppet 93 which has a tapered nose 94 and a shoulder 95. This spring tends to force the power poppet to the right in Fig. 3.

A power poppet valve seat member 96 in the power poppet bore 86 has a stepped outer surface which leaves annular voids 97 and 98 around the surface of the valve seat member where power air inlet passage 85 and power air supply passage 87 respectively intersect the bore 86. O rings 99 are placed between the power poppet valve seat member and the wall of bore 86 on both sides of passages 85 and 87.

The valve seat member 96 has a central bore 100 with a valve seat 101 therein against which the tapered nose 94 of the valve poppet will seat on outside corner of poppet nose 94 when the poppet is moved its full travel to the right.

The power poppet valve seat member has a first drilled hole 102 interconnecting the annular void 98 and the central bore 100, and a second drilled hole 103 interconnecting annular void 97 and the central bore 100. An enlarged chamber 104 is provided adjacent valve seat 101 to give clearance around the tapered nose of the power poppet 93. The poppet diameter is sliding fit seal, and same diameter as sealing point on seat. This way the air forces acting on poppet and therefore spring 92 are the same when poppet is in the opened or closed position.

When the power poppet 93 is drawn to the left in Fig. 3, air flows from power air inlet port 54 through power air inlet passage 85 to annular void 97, through hole 102, bore 100, hole 103, and then to power air supply passage 87 and power air port 60.

Exhaust poppet bore 91 has a shoulder 104 therein, and accommodates an exhaust poppet valve seat member 105. This valve seat member has a shoulder 104a which, in conjunction with shoulder 104 leaves an annular void 106 around the valve seat member where passage 39 intersects the exhaust poppet bore 91. O rings 107 seal between the valve seat member and the wall of bore 91 on both sides of the annular void 106.

A stepped axial bore 108 through the valve seat member provides a poppet guide 109 and an exhaust port 110. Between the guide and the port is an expanded chamber 111. A valve seat 112 is formed at the left hand edge of said chamber around the opening to the exhaust port 110. A drilled hole 113 interconnects the annular void 106 with said chamber 111.

An exhaust poppet 114 moves in guide 109, and when moved its full travel to the left in Fig. 3, closes the exhaust port 110. When the exhaust poppet is moved to the right the port 110 will be open. An exhaust poppet spring 115 tends to close the exhaust port 110. The exhaust poppet has a shoulder 116 facing away from the spring. The exhaust poppet makes a sliding-seal fit in poppet guide 109. The poppet seals at its outer corner so that it is pressure-balanced.

A diaphragm chamber 117 in the body contains a flexible diaphragm 118. In the diaphragm chamber, on the lower side of the diaphragm in Fig. 4, there is a control pressure inlet port 119 for admitting pressure from control circuit 40. This diaphragm comprises a flexible sheet 120, a backing member 121, and a grommet 122 for holding the diaphragm parts together. A contact plate 123 is attached to the grommet.

A pivot shaft 124 is journaled in the body 84 and suspends a pivot 125 in the chamber, which pivot is pinned to the shaft. The pivot has a contact point 126 which rests on the contact plate 123.

The contact point is eccentric with relation to the pivot shaft so that upward motion of the diaphragm will cause the pivot to rotate counter clockwise as the device is illustrated in Fig. 4. At an upper portion of the pivot there is transverse pin 127 which makes contact with shoulder 95 on the power valve poppet and with the shoulder 116 on the exhaust poppet so that movement of the diaphragm in one direction opens one but only one of the valves, depending on the direction the diaphragm moves.

A lever 128 is pinned to the pivot shaft 124 outside the body 84 so that turning the lever 128 turns the pivot. Spring 129 is connected to the lever, and to an adjustable catch 130. The catch can be moved to stretch the spring by various amounts to preload the lever 128.

Cut-off valve 53 has a body 131 with an accumulator chamber 52 which is connected to the shop air supply via a branch of conduit 44. Within this cut-off valve there is provided a poppet arrangement for quick valve actuation. This poppet arrangement includes a main flow poppet 132 which is disposed in a main cylinder 133.

The main cylinder extends partway across the cut-off valve body, and terminates at an annular shoulder 134. The left hand portion of this shoulder has a frusto conical valve seat 135 which seals with a shoulder 136 on said main flow poppet 132, when said poppet is moved entirely to the right in Fig. 1. To keep the main flow poppet normally at this closed position, a coil spring 136 is placed to the left thereof. An inlet port 137 admits air to the main cylinder 133 from the accumulator 52. An O ring 138 seals between the main flow poppet 132 and the wall of cylinder 133.

A central cylinder 139 is bored in the right hand end of the main flow poppet 132 to receive a pilot valve assembly 140. This pilot valve assembly comprises a cylindrical valve body 141 which fits snugly within the central cylinder 139 and which carries an O ring 142 on its outside periphery. A pilot chamber 143 in the cylindrical valve body 141 connects with the central cylinder by means of a passage 144. A passage 145 interconnects the accumulator chamber with the passage 144 through an annular void 146 around the main flow poppet. Pressure from accumulator 52 is therefore continuously exerted upon passage 144. Passage 147 in the wall of cylindrical valve body 141 conducts pressure from pilot chamber 143 to the right hand side of the main flow poppet 132.

A pilot poppet 148 comprises a plug 149 with a first seat 150 for closing passage 144 when the pilot is moved as in Fig. 1, and a second seat 151 at the other end of said plug for closing a bleed passage 152. A rod 153 is attached to plug 149 and passes through bleed passage 152.

Rod 153 has a collar 154 at the end opposite the plug which makes a sliding fit within a cylinder 155 on the other side of the bleed passage 152 from the pilot chamber 143. Cylinder 155 is in fluid communication with pilot chamber 143 through bleed passage 152, and is in communication with the atmosphere through an exhaust port 156.

A coil spring 157 presses against the right hand side of said collar and surrounds a post 158 with head 159 thereon which is an integral part of the pilot poppet 148. Post 158 makes a sliding fit in a cage 160 which surrounds the head 159 of the poppet. The cage is capable of exerting sufficient force on the coil spring 157 to move the pilot poppet to the left to close passage 144. The cage has a contact button 161 on its outside end, and is slidably fitted in the cylinder 155.

Trigger valve 51 is attached to the cut-off valve by an arm 162. The trigger valve comprises a body 163 having a diaphragm chamber 164 therein. A flexible diaphragm 165 extends across said diaphragm chamber, and has a first backing plate 166 at its center on the left hand side as shown in Fig. 1. A second backing plate 167, on the other side of the diaphragm has a needle 168 with a seat 169 on its end, for closing regulated control pressure inlet port 56 when the diaphragm is forced to the right in Fig. 1. A coil spring 170 biases the diaphragm to the right, tending to seat the needle. A threaded plug 171 having a passage 172 therein serves as an adjustable mounting means for a spring support 173. A slidable push rod 174 fits in the passage in the threaded plug.

Conduit 49 connects to a control pressure inlet port 175 which leads into the diaphragm chamber on the same side of the diaphragm as the regulated control pressure inlet port 56. A pressure gauge 176 is provided to indicate the pressure inside the diaphragm chamber.

A trigger 177 is mounted to the trigger valve by a pivot 178. This trigger has a lower arm 179 which a spring 180 biases in a counter clockwise direction in Fig. 1. A medial arm 181 has a roller 182 on the end thereof which makes contact with the contact button 161 of the cut-off valve.

An upper arm 183 of the trigger carries contact pin 184 threaded therein and disposed opposite the push rod 174 so as to make an adjustable contact therewith. The upper arm also carries a threaded spring retainer 185 thereon which retains a spring 186 and push button 187. The push button makes contact with the body of the trigger valve and utilizes the spring 186 as an override provision.

The embodiment of Fig. 2 is a device for single stage actuation of bag filling machinery in which a secondary orifice assembly 22, related to the bag chair as before, is provided in a control circuit 200. This control circuit 200 lies between the primary orifice 41 and the variable secondary orifice 22.

Shop air supplied by conduit 201 to a pressure regulator valve 202 which provides regulated air pressure to a primary orifice 41 and, through conduit 203, to the regulated control pressure inlet port 56 of trigger valve 51. Control circuit pressure is provided through conduit 204 to the control pressure air inlet port 175 of the trigger valve 51.

A power cylinder 205 is formed integrally with the body of cut-off valve 53 so that exhaust port 63 of the cut-off valve discharges directly into a cylinder 206. A piston assembly 207 comprises a piston 208 which has an O ring 209 to act as a seal between the piston and the cylinder 206, with a rod section 209 of lesser diameter than the piston. The rod section slides in an end plate 210 on the power cylinder. O ring 211 makes a sliding seal between section 209 of the piston assembly and the end plate 210.

Link 212 interconnects the piston assembly 207 with a supply valve which controls the flow of material into a container. Retraction port 213 receives shop air through conduit 214 to retract the piston assembly 207, while branch 215 from conduit 214 introduces shop air pressure to accumulator chamber 52.

The constructions of trigger valve 51 and cut-off valve 53 are the same as those described in connection with the embodiment of Fig. 1, and reference may be had to the above description for further structural details.

The operation of the system shown in Fig. 1 will now be described. As shown in solid line in Fig. 1, the system has just been actuated, and has started to fill the container 13 with material from hopper 14. The compound piston assembly has been retracted so that the gate 16 is swung away from nozzle 15. The primary and secondary pistons which comprise the compound piston assembly 20 have been retracted by means of air supplied to retraction port 57 of the power cylinder which applies pressure to the left faces of the primary piston 66 and secondary piston 71.

Shop air is admitted to the control circuit 40 by means of conduits 44 and 45. The regulator valve 47 supplies a flow of air at a preselected pressure to primary orifice 41 and to port 55. The secondary orifice-assembly 22 discharges to atmosphere and is directed precisely perpendicularly against the buffeting surface 30. As the container is loaded with the material the flexures 12 begin to deflect and bring the buffeting surface closer to the orifice, thus restricting the escape of air from orifice 36 and raising the back pressure in the control circuit 40. This secondary orifice does not ordinarily begin to exert a significant back pressure until the buffeting surface is within approximately .008 inch of the orifice 36. Since the back pressure increases as the buffeting surface approaches orifice 36, the control circuit pressure is an accurate indication of the load on the back chair. It therefore follows that there is a unique target pressure in the control circuit 40 which corresponds to the target weight to be filled into the container.

As the control circuit pressure rises due to the diminishing spacing between the orifice 36 and the buffeting surface 30, the increasing control circuit pressure is applied to the diaphragm chamber 117 beneath the diaphragm in the power valve 50, and also to the diaphragm chamber 164 in the trigger valve.

The power valve is the first unit to be actuated, but the spring 129 is preloaded by adjustable catch 130 so that a given control pressure must be reached before the power valve is actuated. This pressure preferably corresponds to a high percentage of total load, such as 98 pounds of a 100 pound target weight. As this control pressure is reached, the diaphragm is raised so that the contact plate bears against contact point 126 and moves pin 127 to the left in Fig. 3. This unseats the power poppet 93 so that pressure air can flow into power air inlet port 54, through power air inlet passage 85, bore 102, central bore 100, bore 103, power air supply passage 87, and out power air port 60 of the power valve.

Air pressure from power air port 60 is supplied via conduit 59 to the primary power inlet 58 of the power cylinder, and extends the entire compound piston assembly 20. This extension continues until the adjustable stop nut 82 makes contact with the cap 76 on the cylinder, after which further air supplied through the primary power inlet 58 is ineffectual.

Figure 6:
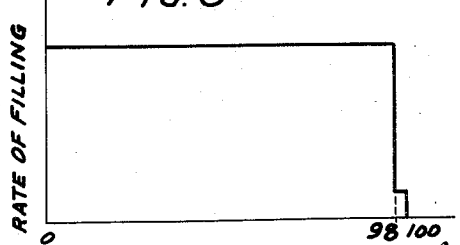
Fig. 6 is a graph showing the rate of container loading relative to the total load in the bag when a container is filled according to one method of this invention.

This actuation of the primary piston causes the gate 16 to be swung part way across the nozzle 15 so as to cut the rate of flow into the container as shown in Fig. 6. It will be seen that the full extension of the primary piston only partially causes the nozzle 15 to close, and so the flow of material into the container continues but at a reduced rate.

The trigger valve and cut-off valve are for the purpose of finally cutting off the supply valves 16 when the target weight in the container is finally reached, and are intended to give a sensitive and accurate response to a control circuit pressure which corresponds to a properly filled container.

Target pressure in the control circuit 40 is conveyed by conduit 49 to the control pressure inlet port 175. The spring 170 is pre-loaded by means of the spring support 173 to yield when the force on the diaphragm exerted by pressure from the control circuit corresponds to a pressure signal which indicates a full container, that is, the target pressure. When this target pressure is reached, the diaphragm 165 is forced to the left in the trigger valve and the needle 168 is unseated from the regulated control pressure inlet port 56. This admits regulated control air pressure to the diaphragm chamber through conduit 55, which pressure is higher than the pressure in the control circuit 40, and violently and abruptly moves the diaphragm to the left so as to force the push rod 174 against the contact pin 184 on the trigger and unseat the trigger.

The unseated trigger is moved in a counter clockwise direction so that the roller 182 moves off of the contact button 161 of the cut-off valve. Then pressure in passage 144 forces the plug 149 to the right where it seals bleed passage 152 and opens the passage 144 to high pressure air. This permits high pressure air from accumulator 52 to flow to the right hand face of the main flow poppet and move said poppet to the left in Fig. 1.

The main flow poppet is thus unseated and permits air to flow through conduit 62 into the secondary power inlet 61 of the power cylinder. This extends secondary piston 71 so as to swing the gate 16 to completely close the nozzle 15.

The container 13 may now be removed from the bag chair and the flexures will restore themselves to their original position thus widening the gap at the secondary orifice assembly 22. However, the piston assembly 20 will not be retracted until the system is reset, inasmuch as the plug 149 will not reseat to close passage 144 and the needle to close port 56 until manually forced to do so. This means that pressure will continue to be exerted in both the secondary and primary cylinder. Even with the increased flow out orifice 22 the control pressure will remain at a high value (almost the full amount of the control regulated pressure) due to the needle 108 leaving port 56 in the trigger valve open. This opening creates a by-pass route around the primary orifice and thereby eliminating the double orifice pressure drop action.

When the system is to be reset, the upper arm 183 is forced toward the trigger valve so that the contact 184 forces the diaphragm to the right and the needle closes the high pressure inlet port 56. At the same time the roller 182 forces the plug to the left so as to close off passage 144. Then the high pressure may drain from the right hand face of the main flow poppet through bleed passage 152 and exhaust port 156. This permits pressure applied to the left hand face of the valve of main flow poppet to reseat the valve seat 135 and close the cut-off valve.

Thereafter, pressure may be drained from the diaphragm chambers of both the power valve 50 and the trigger valve 51 through the secondary orifice assembly. Reduction of the pressure in the power valve diaphragm chamber permits the pivot to turn so as to open the exhaust valve by shifting the exhaust poppet 114. This drains the pressure from behind both the primary and secondary pistons and air in the retraction port 57 shifts the entire piston assembly 20 to the right so as to open the supply valve 16 and refill another container.

Operation of the system shown in Fig. 2 will now be described. This system is a single step type adapted for quick actuation of the supply valve in response to a target pressure.

Control circuit pressure from control circuit 200 is provided to the diaphragm chamber of the trigger valve, and when the target pressure is reached, the needle is unseated to admit high pressure air to the regulated control pressure air inlet port 56. This causes the diaphragm to move abruptly and force the push rod against the contact pin 184, thus rotating the trigger so as to release the plug 149 in the precise manner as described in connection with the embodiment of Fig. 1. This permits air to flow through passage 144 to the lower side of the main flow poppet so as to open the accumulator to the power cylinder past valve seat 135.

The direct flow from accumulator 52 past the main flow poppet and through the exhaust port 63 to the power cylinder causes a speedy extension of the piston from the cylinder to close the shut-off valve.

When the bag is removed from the chair, there will be no tendency for the piston to retract, inasmuch as the plug 149 will still be unseated in passage 144. In order to start another cycle it is necessary to manually press the trigger so as to reseat the needle in the high pressure inlet port so that the pressure may be drained from the diaphragm chamber to the secondary orifice, and so that the main flow poppet can be retracted to close seat 135. Then air supplied via conduit 214 and retraction port 213 may retract the piston and reopen the supply port for another filing cycle.

The advantages of filling a bag at rates according to Fig. 6 are apparent. The first major portion of the load, perhaps as much as 98 to 99 percent, may be quickly supplied to the bag, and the total time for filling a container may thus be cut down. In fact, utilizing this technique, bags and other containers can be filled faster than by conventional technique in which the entire filling operation must be conducted at a lower rate to minimize the errors to be discussed below.

The power valve is set to operate only after a large, predetermined proportion of the target weight has been dumped into the bag. Its actuation abruptly closes the supply valve for a setting which permits only a slow flow of material. Thus while most of the weight is supplied at a maximum rate, the last increment, during which the accuracy of filling is actually determined, is supplied at a lower rate.

Closing off the lower rate has several advantages which make precise filling possible. These advantages are associated with the following tolerances of machinery of this type:

1. Constancy of rate of flow
2. Signal pickup accuracy
3. Time for transmission of the signal If the rate of flow of material at a given supply valve setting were constant, then a container could be filled accurately merely by means of calculating a filling time and clocking the operation of the apparatus. Furthermore, cut-off operation could be made as slow as desired so long as the time for the operation were constant, along with the flow rate. However, bulk materials do not ordinarily flow at a very constant rate, and it is therefore necessary to have an apparatus which is responsive to actual filled weight, so that variations in flow rate will not be directly reflected by errors in the filled weight.

Assuming that the flow rate were constant, then the matter of signal pickup accuracy and transmission time become important, for when target pressure is reached, any delays in shutting off the supply valve will cause an inaccurate weight.

This invention, by providing a slow rate of filling at target weight permits of slight inaccuracies in signal pickup and transmission time, since the flow at a dribble rate which will occur in the fraction of a second transmission lag, for instance will be small, and can be made negligible.

By providing the sensitive, abruptly amplified trigger valve, the target signal is sensitively received and transmitted to a cut-off valve in a minimum time. Then, when the shut-off time is greatly reduced, the flow rate can vary widely, with only negligible errors in filled weight. The transmission time can be minimized by keeping the line from the cut-off valve to the power cylinder of large diameter, short of length, and unobstructed by bends and the like.

The cut-off valve and its trigger valve together make up such fast-acting system that errors due to variation in rate of flow are minimized, and this permits a single-stage system to be utilized. While not as accurate as the double-stage filling technique of Fig. 1, the single-stage system of Fig. 2 is less complex, and for many applications provides consistent filled weights which are well within commercial tolerances.

This invention may be used with standard beam type scales as well as with flexures as shown herein, still remaining within the spirit of the invention, and also comprise "deflection means" for the chair.

This invention is not to be limited by the embodiments shown in the drawings and described in the description which are given by way of example and not of limitation, but only in accordance with the scope of the appended claims.

We claim:

1. Apparatus for filling a container with a predetermined weight of material, comprising: a chair to support the container to be filled; a deflection means attached to the chair which are movable in response to weight in the container, a control circuit conduit; a primary orifice discharging into said conduit; regulator means for supplying pressurized fluid to said primary orifice; a secondary orifice assembly comprising a secondary orifice member and a buffeting surface member having a buffeting surface, said buffeting surface being spaced from said secondary orifice, with the secondary orifice discharging fluid under pressure upon said buffeting surface, one of said members being stationary and the other being attached to and movable with the chair whereby deflection of the deflection means in response to material loaded into the container varies the spacing between said members and variably impedes flow of fluid through the secondary orifice assembly, thereby varying the pressure in the control circuit conduit; a supply line for conveying material to the container; a supply valve in said line; a power cylinder; a slidable piston assembly in said power cylinder whose extension is responsive to fluid pressure in said power cylinder, said piston assembly comprising a primary piston and a secondary piston, said secondary piston being movable independently of said primary cylinder, said piston assembly being linked with said supply valve for opening and closing said supply valve, said power cylinder having an inlet for the primary piston and an inlet for the secondary piston, power valve means connected to the inlet for the primary piston for supplying fluid under pressure to said primary piston in response to an increased pressure in the control circuit conduit; cut-off valve means connected to the inlet for the secondary piston for supplying fluid under pressure to said secondary piston, said cut-off means being responsive to pressure in the control circuit conduit at a control circuit pressure corresponding to a predetermined weight of material in the container.

2. Apparatus according to claim 1 in which the control circuit conduit discharges a stream of pressurized fluid substantially perpendicularly from the secondary orifice upon said buffeting surface, and in which the buffeting surface is attached to chair so as to move therewith, toward and away from said orifice, still maintaining its perpendicular relationship to the orifice.

3. Apparatus according to claim 1 in which the power valve means comprise a body with a diaphragm chamber therein, a diaphragm across said chamber, said body having an inlet to the chamber on one side of the diaphragm for admitting pressure from the control circuit conduit, a pivot journaled in the diaphragm chamber and bearing eccentrically against said diaphragm, whereby movement of the diaphragm rotates the pivot, and valve means opened by rotation of the pivot for passing pressurized fluid to the power cylinder.

4. Apparatus according to claim 3 in which the cut-off valve means comprises a body having a main cylinder therein, a first valve seat at one end of said main cylinder, a main flow poppet having an axial, central cylinder at one end thereof, an annular void around its periphery, and a passage interconnecting said annular void and central cylinder, a piston on the said main flow poppet slidably fitted in said main cylinder, a second valve seat on said main flow poppet adapted to close the said first valve seat in one position of the poppet, said body being pierced by an entry port on an exhaust port on opposite sides of said first valve seat, a pilot poppet assembly comprising a valve body insertable in said central cylinder having a pilot chamber therein, a first passage interconnecting said central cylinder and pilot cylinder, a passage interconnecting said pilot chamber with one face of said main flow poppet, a bleed port interconnecting the pilot chamber and the outside of the body, and a plug in said pilot chamber so disposed and arranged as to close the passage between the central cylinder and pilot chamber in one position, and to close the bleed port in another position, whereby shifting the plug to open said passage into the pilot chamber admits pressurized fluid to move the main flow poppet and open said valve seats to permit flow of fluid to actuate the power cylinder, and whereby moving said plug to close said passage permits fluid to pass through the bleed port and also to move the poppet to close the seats and stop flow of fluid through the cut-off valve.

5. Apparatus according to claim 4 in which the cut-off valve means are actuated by a trigger valve responsive to a target pressure in said control circuit conduit corresponding to a container filled to a predetermined weight, said trigger valve comprising a body having a diaphragm chamber therein, a control pressure inlet port and a high pressure inlet port entering said diaphragm chamber, a diaphragm across said chamber, said ports both discharging on a single side of said diaphragm, a needle on said diaphragm directed toward and insertable in said high pressure inlet port for closing the same, springing means for biasing the diaphragm to normally hold the needle in said high pressure inlet port, and a push rod movable by the diaphragm in response to movement of said diaphragm, whereby target pressure from said control circuit conduit moves the diaphragm to unseat the needle and open the high pressure inlet port, whereupon high pressure fluid enters the diaphragm chamber to abruptly move said diaphragm and move the push rod to actuate cut-off valve means for shutting off the supply valve.

6. Apparatus according to claim 5, wherein said trigger valve has a trigger which in one position rests against means connected to the plug so as to close the passage into the pilot chamber and thus close the cut-off valve and which, when struck by said push rod, is dislodged from said first-named position to allow the plug to open said passage and close the bleed port to open the cut-off valve.

7. In apparatus for filling a container with a predetermined weight of material wherein a supply line has a valve actuated by a piston slidably mounted in a power cylinder, and wherein a control signal is provided by back pressure in a control circuit in which pressure is determined by the provision of a regulated pressure to a primary orifice and the varying of pressure in the conduit determined by the variable spacing in a secondary orifice which is proportional to the weight in the container, and in which there are provided cut-off valve means for supplying fluid under pressure to said power cylinder, a trigger valve for actuating said cut-off valve means comprising: a body having a diaphragm chamber therein, a control pressure inlet port and a high pressure inlet port entering said diaphragm chamber, a diaphragm across said chamber, said ports both discharging on a single side of said diaphragm, a needle on said diaphragm directed toward and insertable in said high pressure inlet port for closing the same, springing means for biasing the diaphragm to normally hold the needle in said high pressure inlet port, and a push rod movable by the diaphragm in response to movement of said diaphragm, whereby target pressure from said control circuit conduit moves the diaphragm to unseat the needle and open the high pressure inlet port, whereupon high pressure fluid enters the diaphragm chamber to abruptly move said diaphragm and move the push rod to actuate cut-off valve means for shutting off the supply valve.

8. Apparatus according to claim 7 in which the cut-off valve means comprise a body having a main cylinder therein, a first valve seat at one end of said main cylinder, a main flow poppet having an axial, central cylinder at one end thereof, an annular void around its periphery, and a passage interconnecting said annular void and central cylinder, a piston on the said main flow poppet slidably fitted in said main cylinder, a second valve seat on said main flow poppet adapted to close the said first valve seat in one position of the poppet, said body being pierced by an entry port on an exhaust port on opposite sides of said first valve seat, a pilot poppet assembly comprising a valve body insertable in said central cylinder having a pilot chamber therein, a first passage interconnecting said central cylinder and pilot cylinder, a passage interconnecting said pilot chamber with one face of said main flow poppet, and a bleed port interconnecting the pilot chamber and the outside of the body a plug in said pilot chamber so disposed and arranged as to close the passage between the central cylinder and pilot chamber in one position, and to close the bleed port in another position, whereby shifting the plug to open said passage into the pilot chamber admits pressurized fluid to move the main flow poppet and open said valve seats to permit flow of fluid to actuate the power cylinder, and whereby moving said plug to close said passage permits fluid to pass through the bleed port and also to move the poppet to close the seats and stop flow of fluid through the cut-off valve.

9. Apparatus according to claim 8 wherein said trigger valve has a trigger which in one position rests against means connected to the plug so as to close the passage into the pilot chamber and thus close the cut-off valve and which, when struck by said push rod, is dislodged from said first-named position to allow the plug to open said passage and close the bleed port to open the cut-off valve.

References Cited in the file of this patent

UNITED STATES PATENTS

| | | |
|---|---|---|
| 2,264,562 | Bryant et al. | Dec. 2, 1941 |
| 2,408,842 | Garretson et al. | Oct. 8, 1946 |
| 2,436,983 | Vredenburg | Mar. 2, 1948 |
| 2,544,734 | St. Clair | Mar. 13, 1951 |
| 2,605,075 | Brown | July 25, 1952 |
| 2,645,447 | Clark et al. | July 14, 1953 |
| 2,670,920 | Meadors | Mar. 2, 1954 |
| 2,751,181 | Baldwin | June 19, 1956 |